United States Patent
Nakamura

(10) Patent No.: US 6,779,028 B1
(45) Date of Patent: Aug. 17, 2004

(54) SYSTEM APPLICATION MANAGEMENT METHOD AND SYSTEM, AND STORAGE MEDIUM WHICH STORES PROGRAM FOR EXECUTING SYSTEM APPLICATION MANAGEMENT

(75) Inventor: Kengo Nakamura, Fuchu (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/521,096

(22) Filed: Mar. 7, 2000

(30) Foreign Application Priority Data

Mar. 8, 1999 (JP) .......................................... 11-059873

(51) Int. Cl.$^7$ .......................................... G06F 15/173
(52) U.S. Cl. ...................... 709/223; 709/224; 709/217; 709/205; 719/330
(58) Field of Search .................................. 709/223, 224, 709/101, 217, 205; 718/101; 719/330; 707/10

(56) References Cited

U.S. PATENT DOCUMENTS

| | | | | |
|---|---|---|---|---|
| 5,204,955 A | * | 4/1993 | Kagei et al. ................... 714/55 |
| 5,519,874 A | * | 5/1996 | Yamagishi et al. .......... 709/201 |
| 5,553,239 A | * | 9/1996 | Heath et al. ................. 713/201 |
| 5,819,090 A | * | 10/1998 | Wolf et al. .................. 709/320 |
| 5,835,765 A | * | 11/1998 | Matsumoto .................. 709/102 |
| 6,098,067 A | * | 8/2000 | Erickson ....................... 707/10 |
| 6,170,010 B1 | * | 1/2001 | Hirata et al. ................ 709/223 |
| 6,219,701 B1 | * | 4/2001 | Hirata et al. ................ 709/223 |

* cited by examiner

Primary Examiner—Ario Etienne
Assistant Examiner—Abdullahi E. Salad
(74) Attorney, Agent, or Firm—Oblon, Spivak, McClelland, Maier & Neustadt, P.C.

(57) ABSTRACT

All the operation definitions of a plurality of applications building a system are set in only a specific computer in advance and systematically managed. Additionally, the operation definition of an application is looked up from a computer in which the application actually operates to control the operation of the application. This resolves cumbersomeness of management and enables flexible application distribution.

24 Claims, 12 Drawing Sheets

SYSTEM APPLICATION MANAGEMENT METHOD AND SYSTEM, AND STORAGE MEDIUM WHICH STORES PROGRAM FOR EXECUTING SYSTEM APPLICATION MANAGEMENT

CROSS-REFERENCE TO RELATED APPLICATION

This application is based upon and claims the benefit of priority from the prior Japanese Patent Application No. 11-0598731, filed Mar. 8, 1999, the entire contents of which are incorporated herein by reference.

BACKGROUND OF THE INVENTION

The present invention relates to a system application management method and system, and a storage medium which stores a program for executing system application management.

FIG. 1 is a view showing the arrangement of a conventional application management system.

Referring to FIG. 1, reference numeral 1 denotes a server computer group. In a system in which an application server computer A, application server computer B, and application server computer C are connected to a network 2, the operation definitions of applications operating in the application server computers are set in application operation definition storage files 100, 200, and 300 in units of application server computers 10, 20, and 30, respectively. Application management sections S10, S20, and S30 look up the files and control the operations of applications. An application operation definition means contents that define conditions and execution environment for the operation of an application program.

In this arrangement, every time addition/change of an application occurs according to addition/change of a function of the computer system, the application operation definition storage files on all application server computers associated with the application must be updated. In addition, each application server computer has an application operation definition storage file.

The problems of the above-described prior art can be summarized as follows.

In the conventional application management system, the application server computers 10, 20 and 30 have the application operation definition storage files 100, 200, and 300, respectively, as shown in FIG. 1. This makes file management complicated. Additionally, in case of addition or change of a function in the computer system, it is difficult to flexibly distribute applications to a plurality of application server computers.

BRIEF SUMMARY OF THE INVENTION

Accordingly, it is an object of the present invention to provide a system application management method and system which resolve cumbersomeness in managing each application operation definition in a computer system and realize flexible application distribution, and a storage medium which stores a program for executing system application management.

According to an aspect of the present invention, there is provided an application management system applied to a system including a network and a plurality of computers connected to the network, comprising: means, provided in a specific computer of the plurality of computers, for setting in advance operation definitions of a plurality of applications which operate on one or more computers except the specific computer and systematically managing the operation definitions; and application management means, provided in the one or more computers except the specific computer, for looking up, through the network, an operation definition managed by the specific computer to control an operation of a to-be-managed application.

In the system, the systematic management means may comprise means for storing the operation definitions of the plurality of applications put into groups in designated units of applications or functions, and the application management means may look up the operation definitions to simultaneously operate the plurality of applications put into groups.

The system may further comprise means for monitoring an execution time of the to-be-managed application.

The system may further comprise means for detecting an operation error of the to-be-managed application and requesting the application management means to execute post-processing of the application.

The system may further comprise means for setting an operable/inoperable state of each of the plurality of applications put into groups in the designated units of applications or functions.

The system may further comprise means for operating the to-be-managed application at a predetermined cycle.

The system may further comprise means for recognizing a state of an application for receiving ;data in communication between applications, and in accordance with the recognition result, dynamically changing a computer in which the application for receiving data operates.

The system may further comprise means for looking up an operation state of an application operating in each computer group.

According to another aspect of the present invention, there is provided an application management method applied to a system including a network and a plurality of computers connected to the network, comprising the steps of: in a specific computer of the plurality of computers, setting in advance operation definitions of a plurality of applications which operate on one or more computers except the specific computer and systematically managing the operation definitions; and from the one or more computers except the specific computer, looking up, through the network, an operation definition managed by the specific computer to control an operation of a to-be-managed application.

The method may further comprise storing the operation definitions of the plurality of applications put into groups in designated units of applications or functions, and looking up the operation definitions to simultaneously operate the plurality of applications put into groups.

The method may further comprise monitoring an execution time of the to-be-managed application.

The method may further comprise detecting an operation error of the to-be-managed application and issuing an execution request for post-processing of the application.

The method may further comprise setting an operable/inoperable state of each of the plurality of applications put into groups in the designated units of applications or functions.

The method may further comprise operating the to-be-managed application at a predetermined cycle.

The method may further comprise recognizing a state of an application for receiving data in communication between applications, and in accordance with the recognition result, dynamically changing a computer in which the application for receiving data operates.

The method may further comprise looking up an operation state of an application operating in each computer group.

According to still another aspect of the present invention, there is provided a computer-readable storage medium having program components stored thereon that perform application management in a system including a network and a plurality of computers connected to the network, the program components comprising: means for setting in advance, in a specific computer of the plurality of computers, operation definitions of a plurality of applications which operate on one or more computers except the specific computer and systematically manage the operation definitions; and means for looking up, from the one or more computers except the specific computer through the network, an operation definition managed by the specific computer to control an operation of a to-be-managed application.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention in which.

DETAILED DESCRIPTION OF THE INVENTION

The embodiments of the present invention will be described below with reference to the accompanying drawing.

Figure 2:
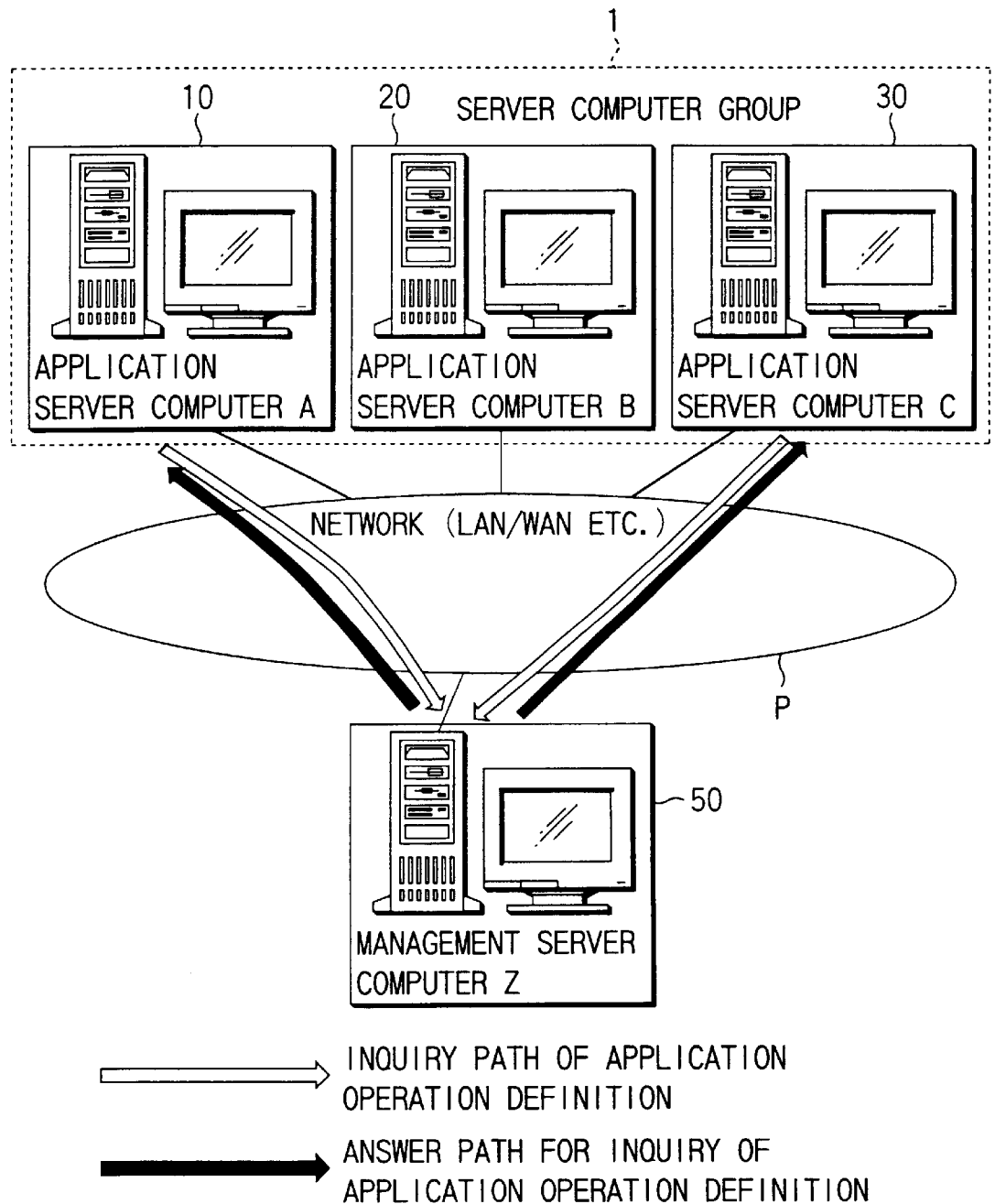
FIG. 2 is a view showing the arrangement of a system application management system according to each embodiment of the present invention.

FIG. 2 is a view showing the basic arrangement of a system application management system according to each embodiment of the present invention.

This system includes an application server computer (A) 10, application server computer (B) 20, application server computer (C) 30, and management server computer (Z) 50. The computers are connected through a network 2 such as a LAN or WAN. The number of application server computers is not limited to three and changes depending on the system scale.

First Embodiment

Figure 1:
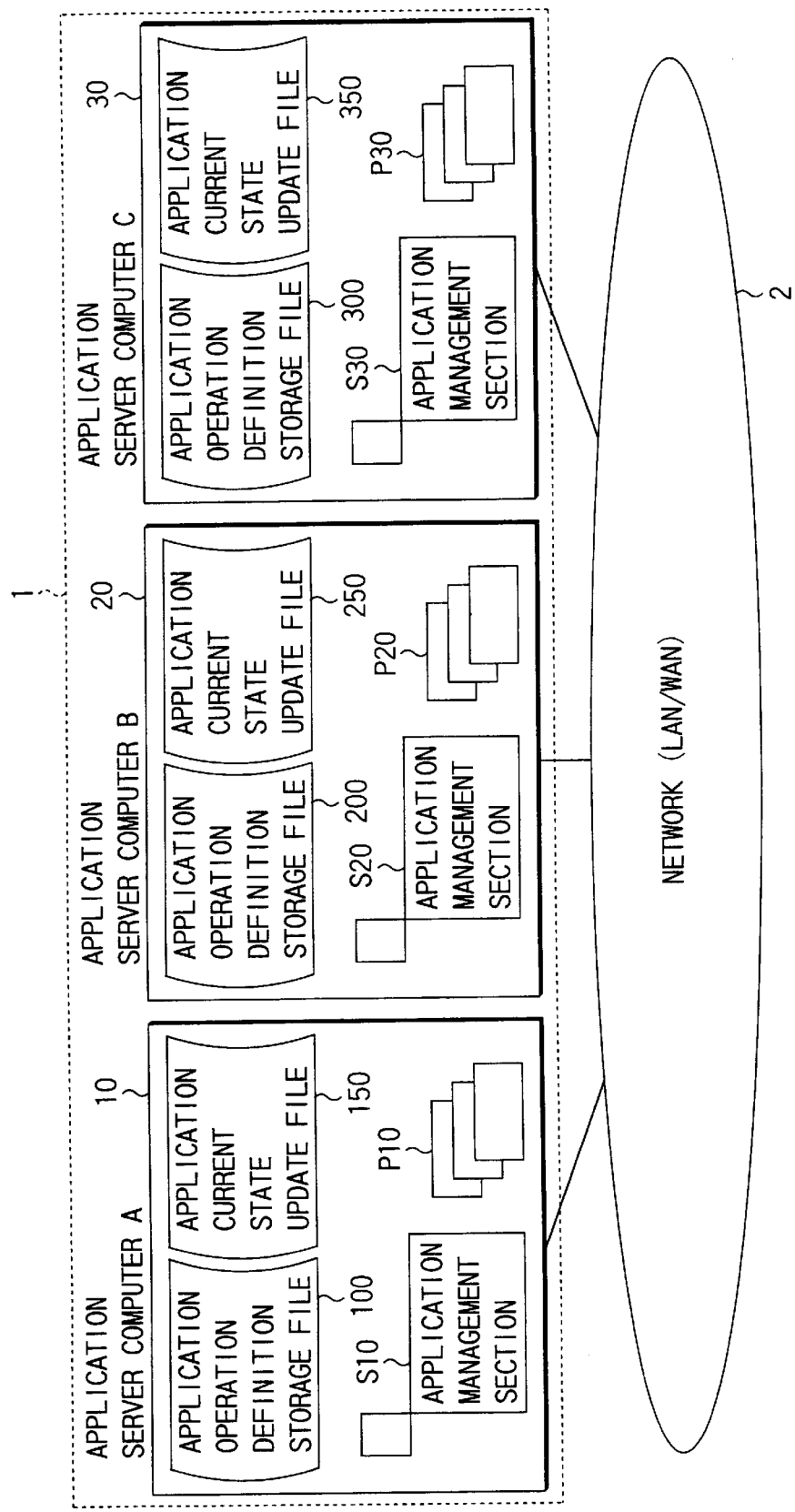
FIG. 1 is a view showing the arrangement of a conventional application management system.
Figure 3:
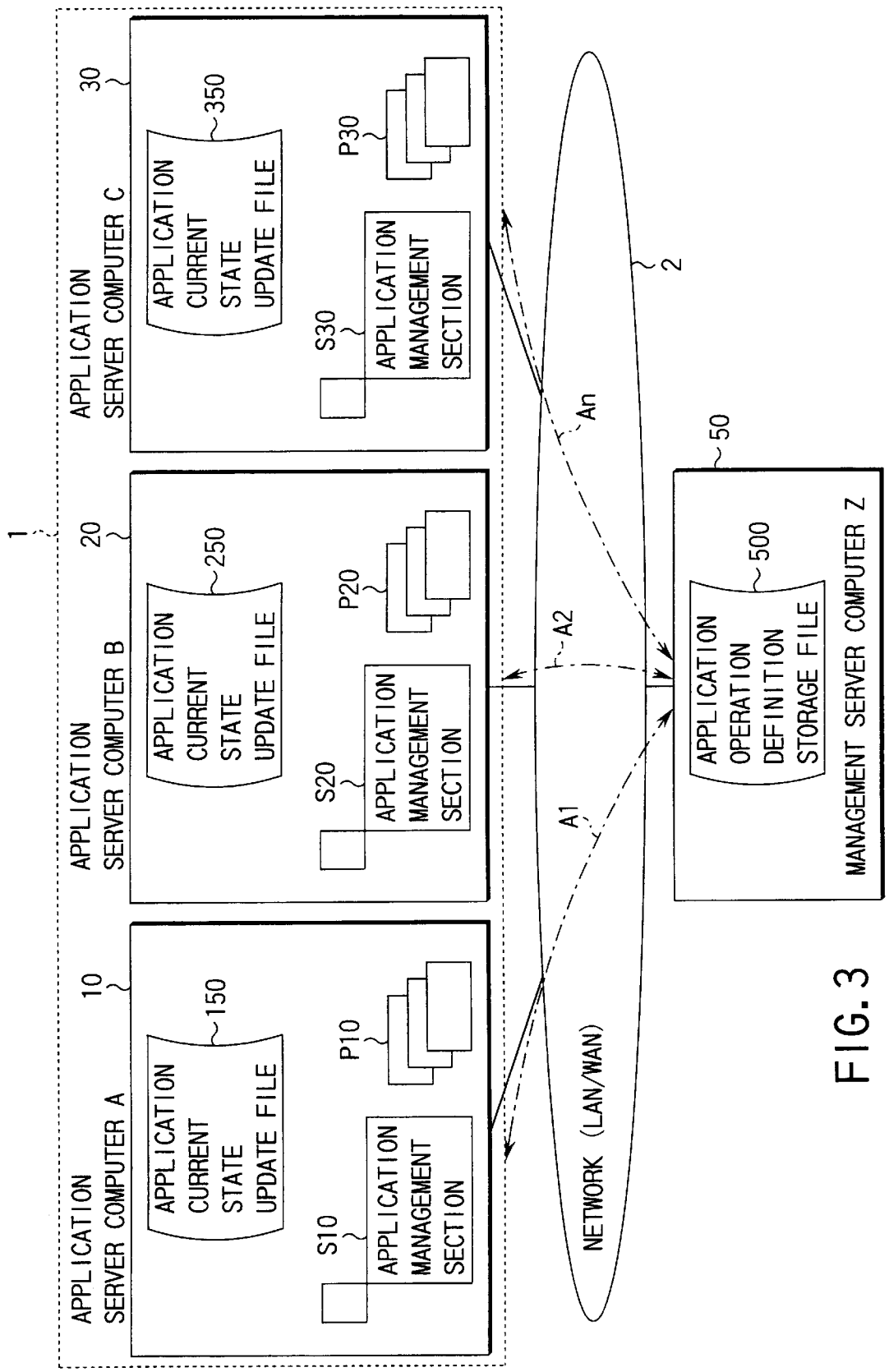
FIG. 3 is a view showing a system application management system according to the first embodiment of the present invention.

In this embodiment, details of the arrangement and function of the above system application management system will be described. FIG. 3 shows the arrangement of an application management system according to the first embodiment. The same reference numerals as in FIG. 1 denote the same parts in FIG. 3, and a detailed description thereof will be omitted.

As a characteristic feature of the arrangement of this embodiment, application operation definition storage files 100, 200, and 300 are removed from the application server computers, and a management server computer (Z) 50 having an application operation definition storage file 500 is provided on the network to systematically manage the application computers. The management server computer (Z) 50 and computers in a server computer group 1 are connected through a network 2 to enable access between the computers. Reference symbols A1, A2, and An denote data access paths. Application server computers A, B, and C may respectively have cache files with the same contents as those of the application operation definition storage file 500 in the management server computer. In this case, the application server computers A, B, and C can immediately look up the application operation definition storage file.

The function of this embodiment will be described next.

Figure 4:
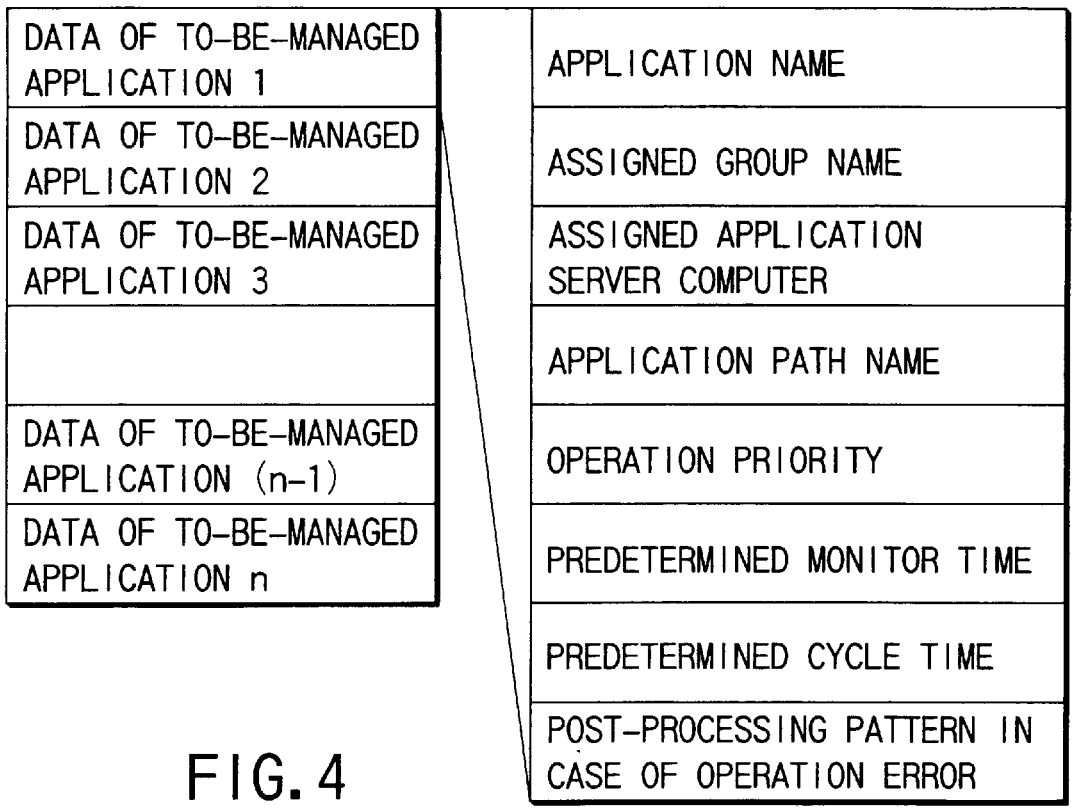
FIG. 4 is a view showing an example of the structure of an application operation definition storage file.

First, the user stores the operation definitions of a plurality of applications operating in the application server group 1 in the application operation definition storage file 500 in the management server computer (Z) 50 in advance. FIG. 4 shows the file structure of information stored in the application operation definition storage file 500. As shown in FIG. 4, the user sets and stores, in advance, operation definitions associated with applications in the form of a table in units of applications to be managed.

The application operation definition storage file 500 has a record structure in units of applications to be managed and comprises a to-be-managed application name, an assigned group name defined to manage applications in units of groups, an assigned application server computer which defines a computer capable of actually operating the application, an application path name which defines the location where the application execution file is stored, operation priority which defines the operation priority of the application to be managed, a predetermined monitor time as a reference time for externally monitoring the operation time of the application to be managed, a predetermined cycle time as a cycle time for externally periodically operating the application to be managed, and a post-processing pattern in case of operation error, which defines post-processing in case of operation error of the application to be managed. The contents of the application operation definition storage file 500 are used to realize the embodiments to be described below.

The operation of an application management section will be described below by exemplifying the application server computer (A) 10 shown in FIG. 3. When an execution request of an application to be managed is generated on the application server computer (A) 10, an application management section S10 receives data added with the name of the application, execution of which is requested, through the network 2 or as data in the application server computer (A) 10.

The application management section S10 looks up the operation definition data of the requested application, through the network 2, from the application operation definition storage file 500 that is systematically managed by the management server computer (Z) 50. The application management section S10 executes a to-be-managed application P10, execution of which is requested, in the computer of its own in accordance with the execution file name represented by the application path name set in the looked up operation definition data of the application and the operation priority.

The application management section S10 stores the states of the executed application P10 in an application current state update file 150. Information stored by the application management section S10 in the application current state update file 150 has the file structure shown in FIG. 5.

Figure 5:
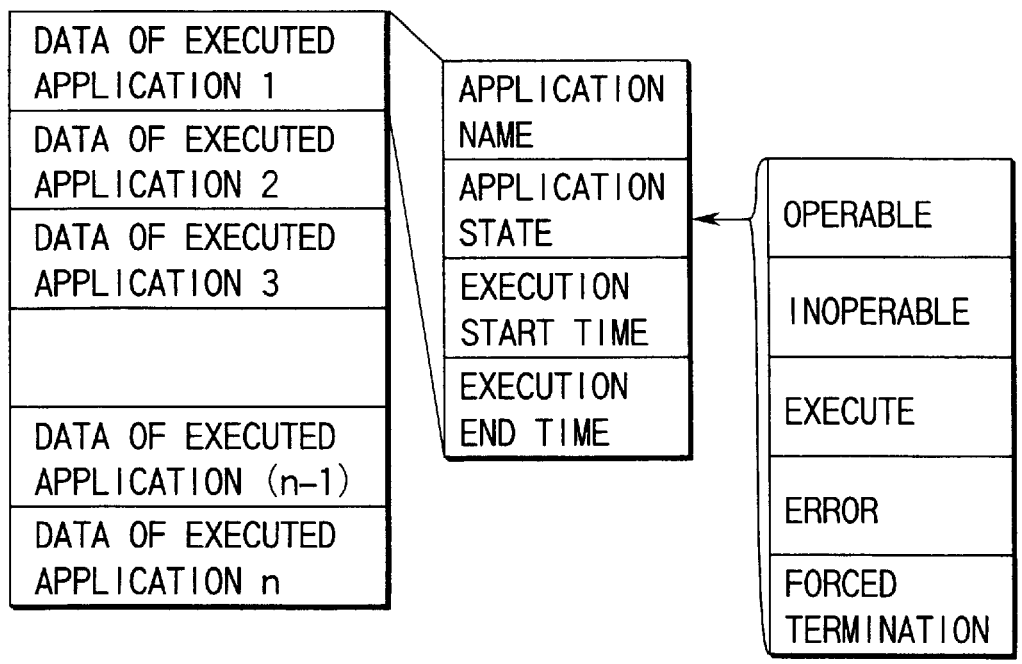
FIG. 5 is a view showing an example of the structure of an application current state update file.

As shown in FIG. 5, the application management section S10 stores states associated with the executed application in the form of a table in units of applications. At the start of execution of the application, the application management section S10 stores the name of the actually executed application, application state (execution in progress), and execution start time in the application current state update file 150.

When the application management section S10 receives an interrupt message indicating an end event of the executed application, the application state (operable) and the execution end time of the application in the application current state update file 150. The application current state update file 150 is used to store the application execution history and used to realize the embodiments to be described below.

The application execution request is transmitted to all application server computers in the server computer group 1 through the network 2. Upon receiving the execution request, the application management section S10 looks up the operation definition of the execution-requested application, through the network 2, from the application operation definition storage file 500 that is systematically managed by the management server computer (Z) 50.

Except when the looked up operation definition of the application indicates that the application operates in that computer, i.e., the application server computer (A) 10, the application management section S10 discards the execution request in the application server computer (A) 10. The application execution request is processed using an application management section in another application server computer.

An application management section S20 in the application server computer (B) 20 and an application management section S30 in the application server computer (C) 30 look up, through the network 2, application operation definitions systematically managed by the management server computer (Z) 50, like the application management section S10.

According to this embodiment, since the application operation definition storage file in the management server computer, which stores the operation definitions of a plurality of applications operating in the server computer group, is accessed from each application server computer through the network, the operation definitions of the plurality of applications operating in the server computer group can be systematically managed.

For this reason, the application server computers can use the same application operation definitions independently of the number of application server computers. Additionally, when the computer in which an application operates is set in the application operation definition storage file, the application start requesting side need not be conscious of the application server computer in which the application operates when requesting the application operation.

In the following embodiments, various functions are added to the system application management system of the first embodiment.

Second Embodiment

Figure 6:
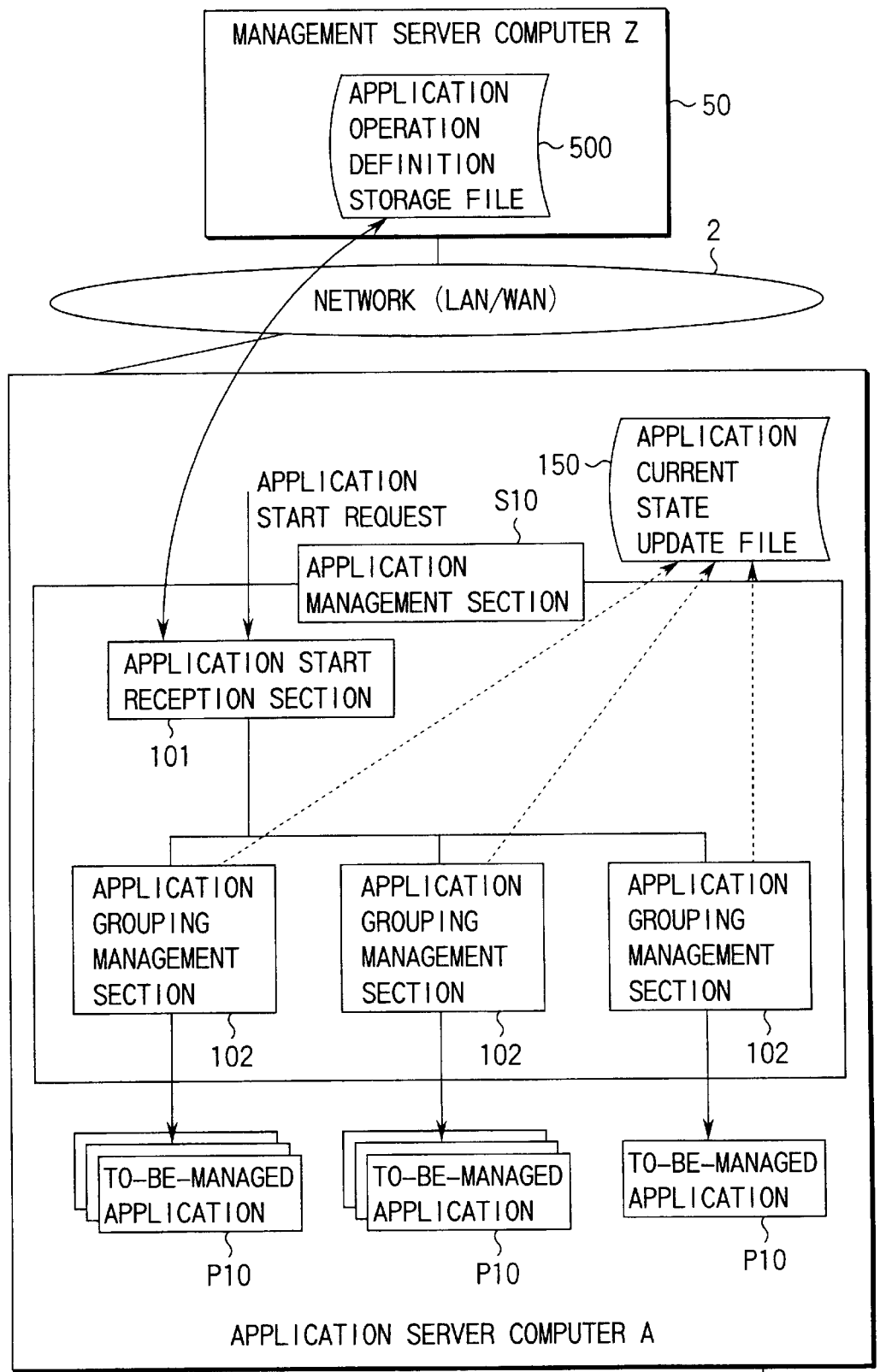
FIG. 6 is a view showing a system application management system according to the second embodiment of the present invention.

FIG. 6 shows the arrangement of an application management system according to the second embodiment. The same reference numerals as in FIG. 3 denote the same parts in FIG. 6.

The application management system of this embodiment comprises an application server computer (A) having an application management section S10 constructed by an application start reception section 101 and application grouping management sections 102, an application current state update file 150, and to-be-managed applications P10, and a management server computer (Z) 50 having an application operation definition storage file 500. The server computers are connected through a network 2 to enable access between the computers.

The function of this embodiment will be described next.

Referring to FIG. 6, when the application management section S10 receives application start request data, the application start reception section 101 receives, through the network 2 from the application operation definition storage file 500 in the management server computer (Z) 50, definition information of all applications corresponding to the group to which the application start of which is requested belongs.

The pieces of received application definition information are transferred to the application grouping management sections 102 corresponding to the application group. The application grouping management sections 102 are prepared in units of assigned group names of the applications shown in FIG. 4, and start the application group P10 in the computer of its own on the basis of the application definition information transferred from the application start reception section 101.

The application grouping management sections 102 store the states of the started applications in the application current state update file 150. The application grouping management sections 102 are stored in the application current state update file 150 in the file structure shown in FIG. 7.

Figure 7:
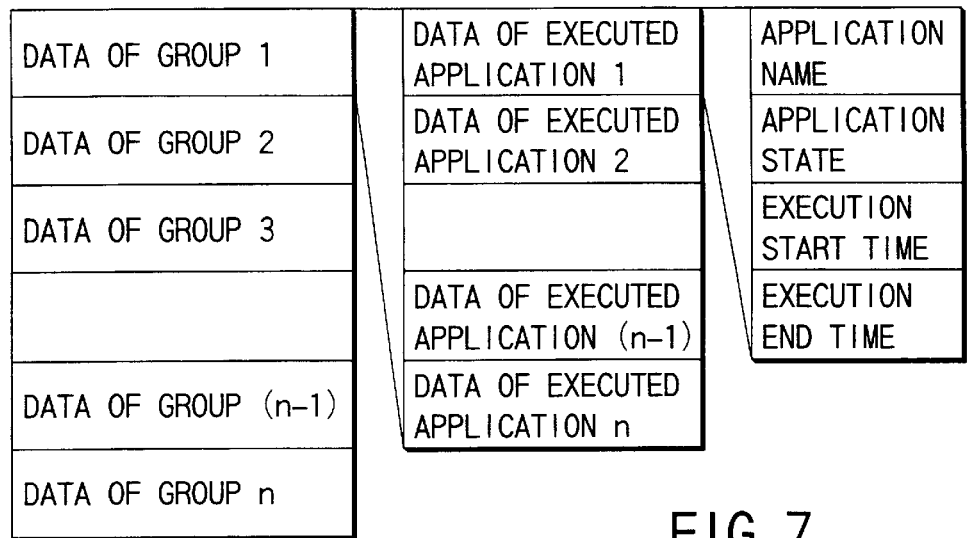
FIG. 7 is a view showing an example of the structure of an application current state update file according to the second embodiment.

More specifically, the application current state update file shown in FIG. 7 has an expanded structure of a record for each group, The application grouping management sections 102 store the application names, application states (execution in progress), and execution start times in the record of the application current state update file 150 corresponding to the group to which the applications P10 execution of which has started belong.

According to this embodiment, applications can be simultaneously started in units of assigned groups. For this reason, when applications are to be simultaneously started at the start time of the server computer itself, a plurality of applications can be started only by designating the assigned group name. Hence, in this embodiment, individual application names need not be designated.

Third Embodiment

Figure 8:
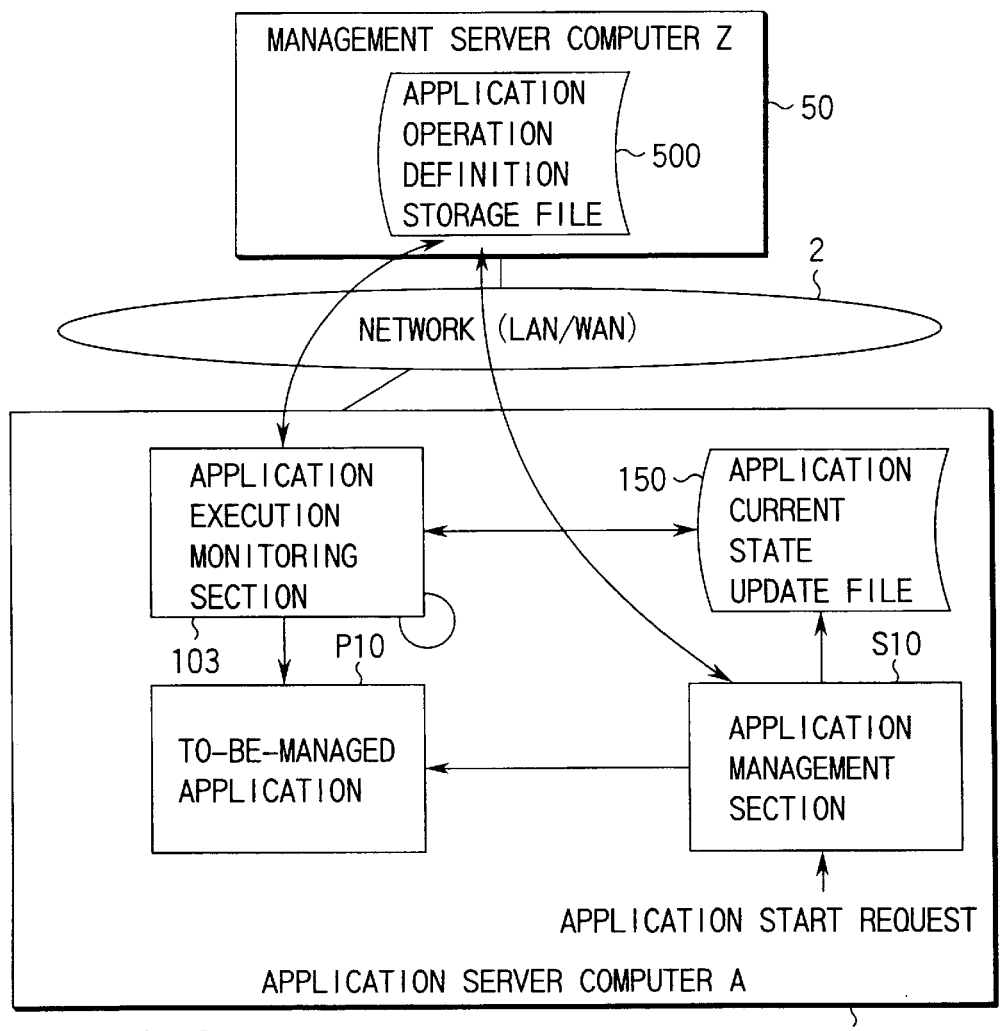
FIG. 8 is a view showing a system application management system according to the third embodiment of the present invention.

FIG. 8 shows the arrangement of an application management system according to the third embodiment. The same reference numerals as in FIG. 3 denote the same parts in FIG. 8.

The application management system of this embodiment comprises an application server computer (A) having an application management section S10, application execution monitoring section 103, application current state update file 150, and to-be-managed application P10, and a management server computer (Z) 50 having an application operation definition storage file 500. The server computers are connected through a network 2 to enable access between the computers.

The function of this embodiment will be described next.

Referring to FIG. 8, when the application management section S10 in the application server computer (A) 10 receives an application start request, the application P10 is executed, and the name of the executed application, application state, and execution start time are stored in the application current state update file 150.

Figure 9:
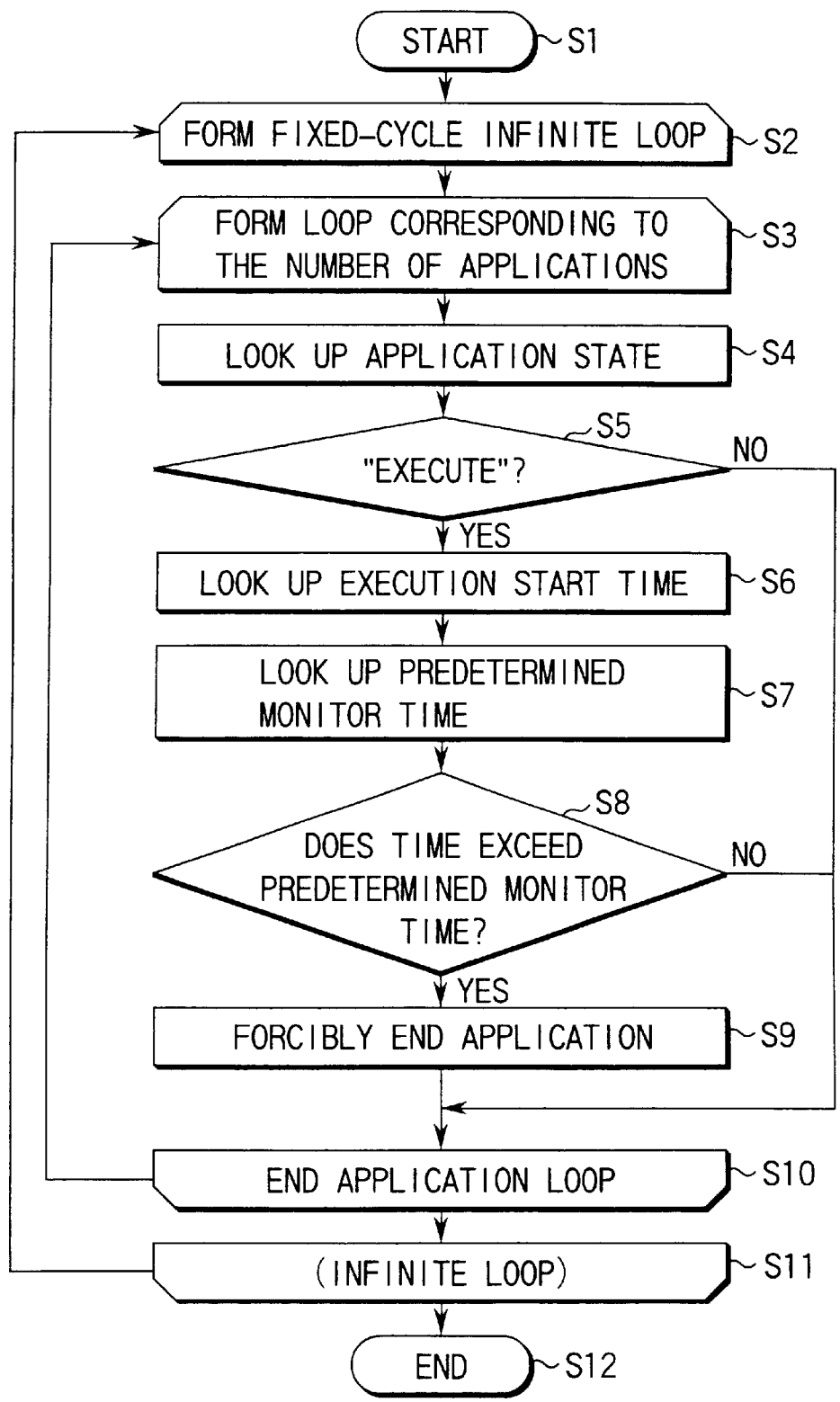
FIG. 9 is a flow chart showing processing of an application execution monitoring section according to the third embodiment.

The application execution monitoring section 103 as a means independent from the application management section S10 operates at a fixed cycle. FIG. 9 is a flow chart for explaining the detailed operation of the application execution monitoring section 103. In step S1, the application execution monitoring section 103 starts operating. In step S2, a fixed-cycle infinite loop is formed. In step S3, a loop corresponding to the number of executed applications stored in the application current state update file 150 is formed.

The application current state update file 150 has a structure shown in FIG. 5. Application names, application states, and execution start and end times are stored in units of executed applications. In step S4, the application state of the application P10 is looked up from the application current state update file 150.

If it is determined in step S5 that the application state looked up in step S4 is "execution in progress", the execution start time of the application P10 is looked up from the application current state update file 150 in step S6. In step S7, the predetermined monitor time corresponding to the application P10 is looked up from the application operation definition storage file 500 in the management server computer (Z) 50 through the network 2.

The application operation definition storage file has a structure shown in FIG. 4. Application names and predetermined monitor times are set in units of applications to be managed. When it is determined in step S8 that the absolute value of the difference between the current time and the execution start time looked up in step S6 exceeds the predetermined monitor time looked up in step S7, the application P10 is forcibly ended in step S9.

At this time, the application state (forced termination) is stored in the application current state update file 150. The current time at this time is regarded as an execution end time. In step S10, the flow keeps forming loops in correspondence with the number of executed applications stored in the application current state update file 150, and then returns to step S3. In step S11, after processing pauses for the fixed cycle time (sleep), the flow returns to step S2.

According to this embodiment, the application execution time is monitored, and an application whose execution time exceeds a predetermined value is determined as abnormal. Since resources of the application server computer can be released by forcibly ending the application, the influence of a shortage in resource on the remaining normal applications can be minimized.

Fourth Embodiment

Figure 10:
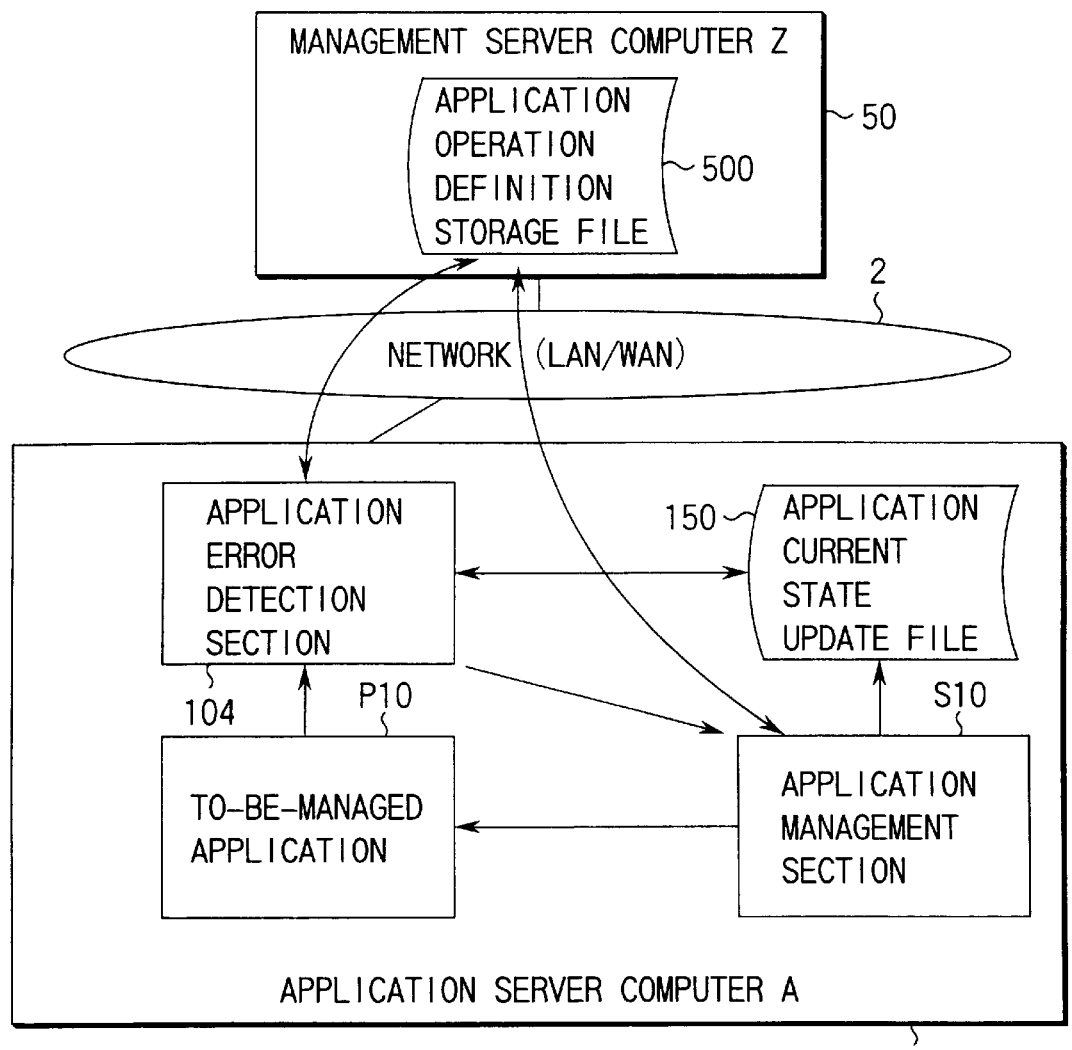
FIG. 10 is a view showing a system application management system according to the fourth embodiment of the present invention.

FIG. 10 shows the arrangement of an application management system according to the fourth embodiment. The same reference numerals as in FIG. 3 denote the same parts in FIG. 10.

The application management system of this embodiment comprises an application server computer (A) having an application management section S10, application error detection section 104, application current state update file 150, and to-be-managed application P10, and a management server computer (Z) 50 having an application operation definition storage file 500. The server computers are connected through a network 2 to enable access between the computers.

The function of this embodiment will be described next.

When the application management section S10 in the application server computer (A) 10 receives an application start request, the application P10 is executed, and the name of the executed application, application state, and execution start time are stored in the application current state update file 150.

When an error occurs in the application P10, the application error detection section 104 as a means independent from the application management section S10 receives an interrupt by that event, stores an application state "error" in the application current state update file 150, and requests the application management section S10 in the application server computer (A) of its own to execute post-processing of the application to be managed.

Upon receiving the post-processing request, the application management section S10 looks up, through the network 2, the post-processing pattern for an operation error of the application P10, which is stored in the application operation definition storage file 500 on the management server computer (Z) 50.

The post-processing pattern is "re-execute application" or "inoperable". In accordance with the pattern, the application management section S10 re-executes the application P10 or stores the application state (inoperable) in the application current state update file 150.

For an application P10 whose application state stored in the application current state update file 150 is "inoperable", the application management section S10 looks up the application current state update file 150 every time an execution request is received, thereby preventing any operation unless the inoperable state is externally cleared.

According to this embodiment, by detecting an application error, recovery is enabled by re-executing the application with error. In addition, an application for which recovery by re-execution is unnecessary or impossible can be set in an inoperable state. For this reason, the influence on the remaining applications of the system can be minimized.

Fifth Embodiment

Figure 11:
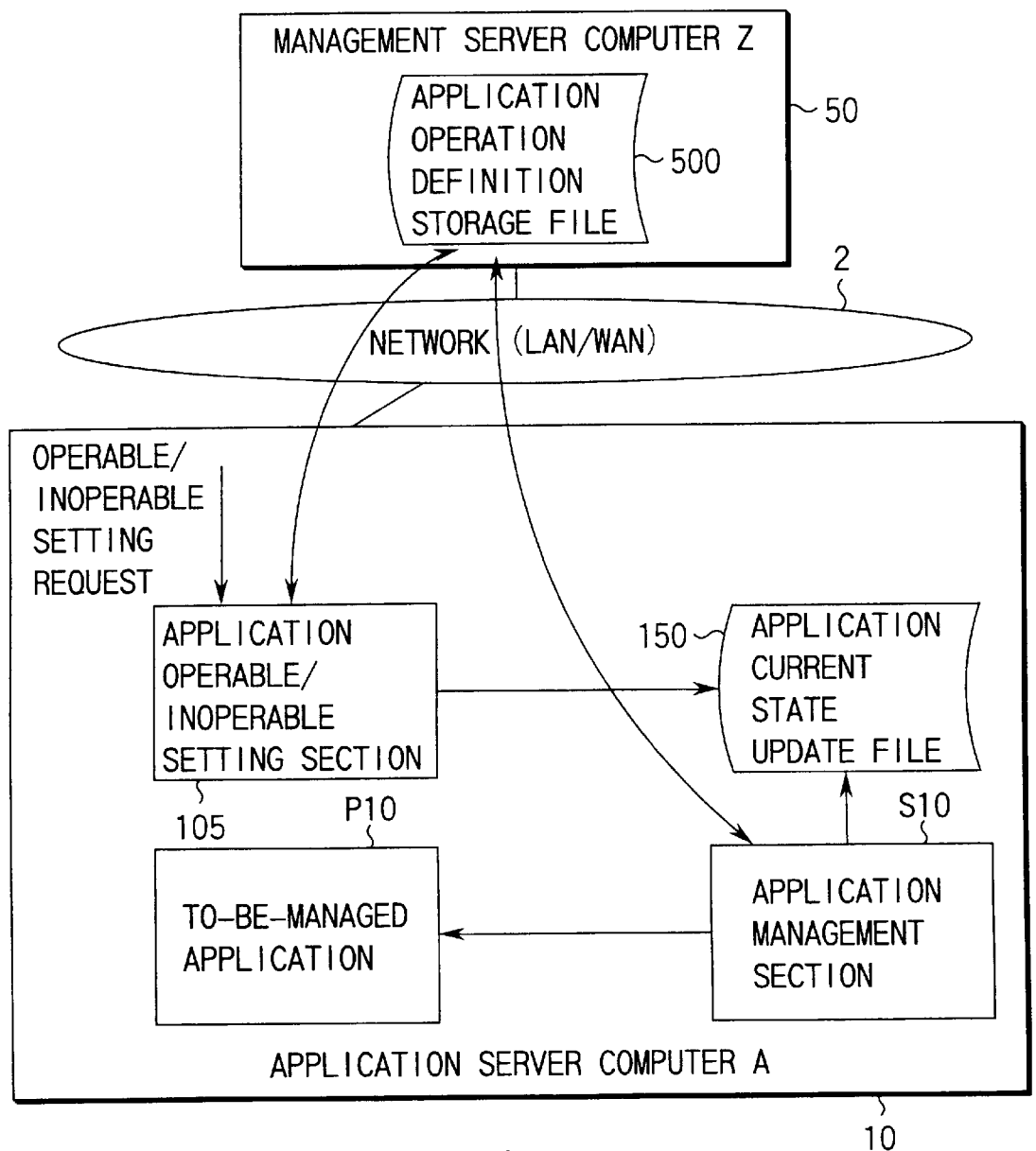
FIG. 11 is a view showing a system application management system according to the fifth embodiment of the present invention.

FIG. 11 shows the arrangement of an application management system according to the fifth embodiment. The same reference numerals as in FIG. 3 denote the same parts in FIG. 11.

The application management system of this embodiment comprises an application server computer (A) having an application management section S10, application operable/inoperable setting section 105, application current state update file 150, and to-be-managed application P10, and a management server computer (Z) 50 having an application operation definition storage file 500. The server computers are connected through a network 2 to enable access between the computers.

The function of this embodiment will be described next.

Referring to FIG. 11, an application operable/inoperable setting request is received by the application operable/inoperable setting section 105 of the application server computer (A) 10. The application operable/inoperable setting section 105 looks up information of a to-be-managed application corresponding to a designated application name or assigned group name from the application operation definition storage file 500 in the management server computer (Z) 50 through the network 2.

The application operable/inoperable setting section 105 sets an operable or inoperable state as an application state corresponding to the looked up application name, which is stored in the application current state update file 150 in units of applications, and stores the application state.

When the application management section S10 of the application server computer (A) 10 is to execute an application P10 upon receiving an application start request, the application P10 is executed if its application state stored in the application current state update file 150 is "operable". The application name, application state (execution), and execution start time are stored in the application current state update file 150 again.

If the application state of the application P10, which is stored in the application current state update file 150, is "inoperable", the application management section S10 discards the start request of the application P10.

According to this embodiment, by setting an application operable/inoperable state, an application operable in an arbitrary application server computer can be changed without changing the contents of the application operation definition storage file.

Sixth Embodiment

Figure 12:
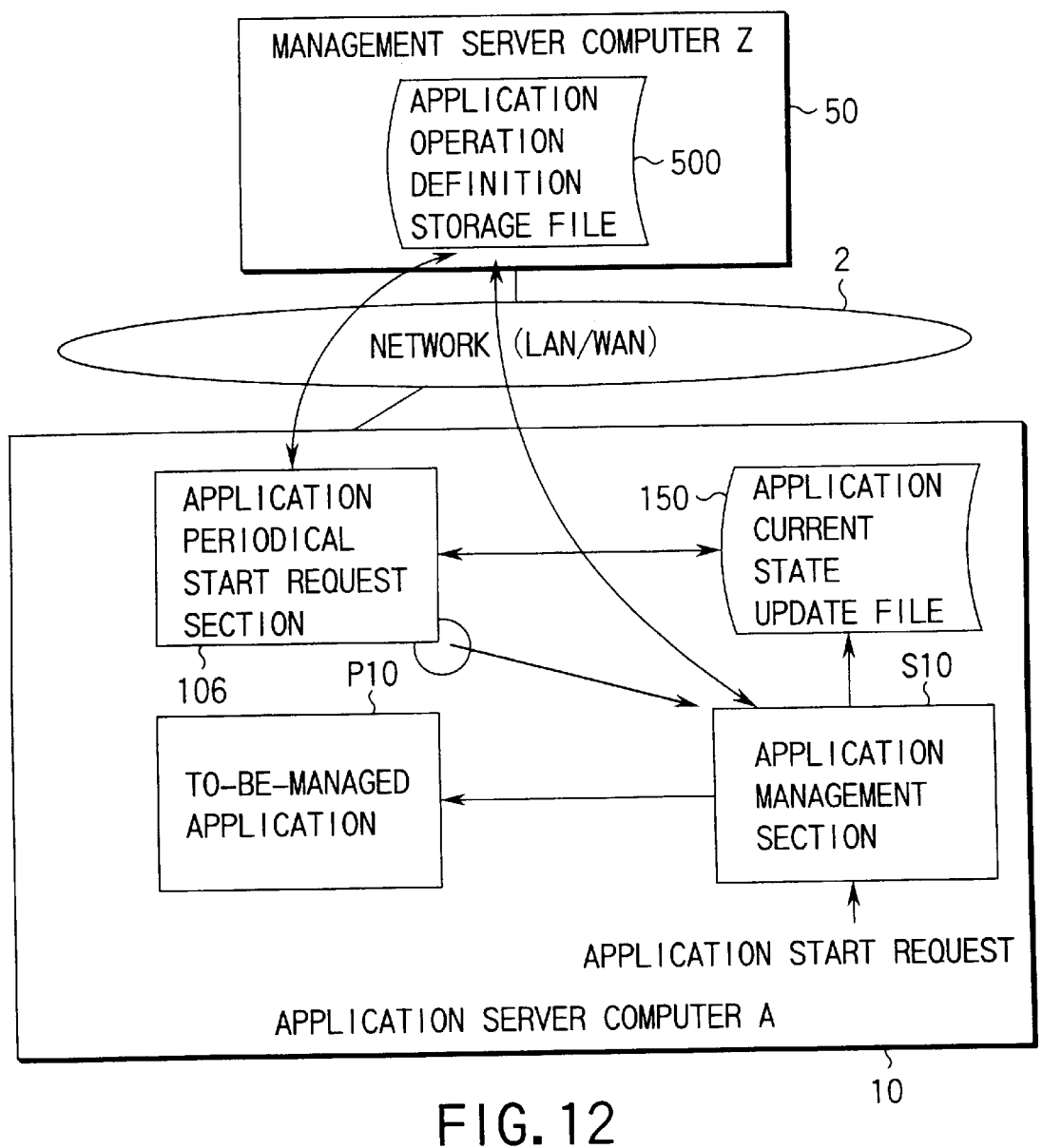
FIG. 12 is a view showing a system application management system according to the sixth embodiment of the present invention.

FIG. 12 shows the arrangement of an application management system according to the sixth embodiment. The same reference numerals as in FIG. 3 denote the same parts in FIG. 12.

The application management system of this embodiment comprises an application server computer (A) having an application management section S10, application periodical start request section 106, application current state update file 150, and to-be-managed application P10, and a management server computer (Z) 50 having an application operation definition storage file 500. The server computers are connected through a network 2 to enable access between the computers.

As shown in FIG. 12, upon receiving an application start request, the application management section S10 of the application server computer (A) 10 executes the application P10 and stores the name of the executed application, application state (execution), and execution start time in the application current state update file 150.

The application periodical start request section 106 as a means independent from the application management section S10 must operate at a cycle shorter than a settable shortest cycle of the predetermined cycle time of each application, which is set in the application operation definition storage file 500.

The application periodical start request section 106 searches for, at a fixed cycle, an application P10 whose execution start time is set in the application current state update file 150. On the basis of the application name found by the search, the application periodical start request section 106 looks up the predetermined cycle time of the application P10 in the application operation definition storage file on the management server computer (Z) 50 through the network 2.

For an application whose predetermined cycle time is set, if the difference between the current time and the execution start time of the application P10 is equal to or larger than the predetermined cycle time, the application periodical start request section 106 requests the application management section S10 to start the application P10. Upon receiving this request, the application management section S10 starts the application. This flow is repeated.

According to this embodiment, the application can be periodically externally started, and design for self periodical start of the application is unnecessary. Because of external periodical start, the start cycle can be changed only by changing the application operation definition storage file, and the application itself need not be changed.

Seventh Embodiment

Figure 13:
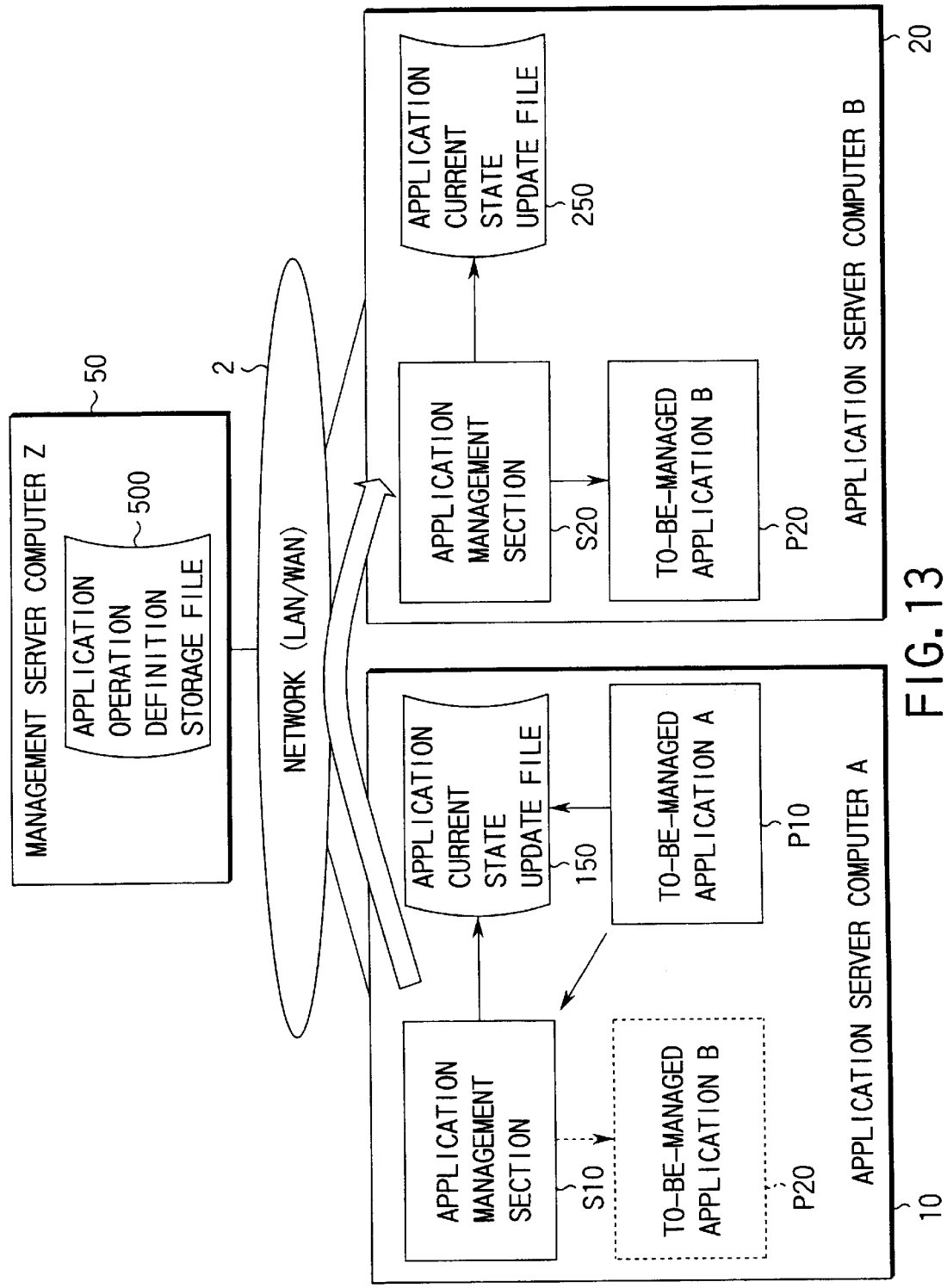
FIG. 13 is a view showing a system application management system according to the seventh embodiment of the present invention.

FIG. 13 shows the arrangement of an application management system according to the seventh embodiment. The same reference numerals as in FIG. 3 denote the same parts in FIG. 13.

The application management system of this embodiment comprises an application server computer (A) having an application management section S10, application current state update file 150, to-be-managed application (A) P10, and to-be-managed application (B) P20, an application server computer (B) having an application management section S20, application current state update file 250, and to-be-managed application (B) P20, and a management server computer (Z) 50 having an application operation definition storage file 500. The server computers are connected through a network 2 to enable access between the computers.

The function of this embodiment will be described next.

In the application server computer (A) 10 shown in FIG. 13, the application (A) P10 transmits data to the application (B) P20. For this reason, the application P10 must send a data transmission request to the application management section S10.

In this case, the application management section S10 confirms the application state of the application (B) P20 as a data destination by looking up the application current state update file 250. When the application state confirmed by this lookup is "operable", the application management section S10 transmits data from the application (A) P10 to the application (B) P20.

When the application management section S10 looks up the application current state update file 250, and this reveals that the application state of the application (B) P20 as a data destination is "inoperable", the application management section S10 looks up the application operation definition storage file 500 in the management server computer (Z) 50 through the network 2.

It is confirmed whether the application (B) P20 also belongs to an application server computer other than the application server computer (A) 10. When the application (B) P20 also belongs to the application server computer (B) 20, the application management section S10 transfers the data transmission request from the application (A) P10 to the application management section S20 of the application server computer (B) 20 through the network 2.

Upon receiving the request, the application management section S20 looks up the application state of the application (B) P20 from the application current state update file 250. If the application is "operable", in the application server computer (B) 20, the application management section S20 transmits data from the application (A) P10 to the application (B) P20.

According to this embodiment, even when the application at the data destination is inoperable in the application server computer of its own, the data destination can be set on an identical application on another application server computer as far as the application operation definition storage file systematically managed by the management server computer defines that the application is operable in the other application server computer. Hence, the software creator need not explicitly design the system to realize redundancy in units of applications.

Eighth Embodiment

Figure 14:
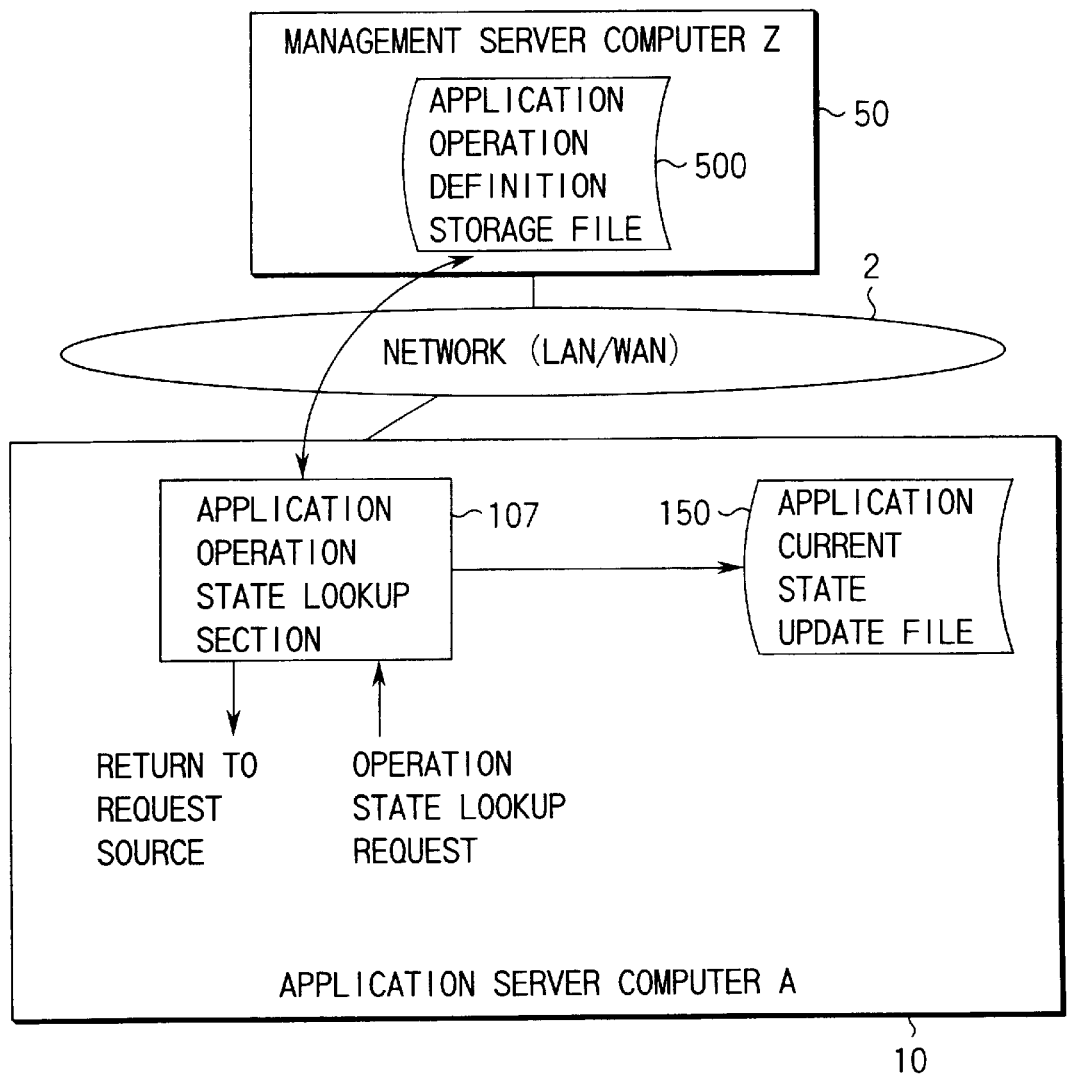
FIG. 14 is a view showing a system application management system according to the eighth embodiment of the present invention.

FIG. 14 shows the arrangement of an application management system according to the eighth embodiment. The same reference numerals as in FIG. 3 denote the same parts in FIG. 14.

The application management system of this embodiment comprises an application server computer (A) having an application current state update file 150 and application operation state lookup section 107, and a management server computer (Z) 50 having an application operation definition storage file 500. The server computers are connected through a network 2 to enable access between the computers.

The function will be described next.

The application operation state lookup section 107 in the application server computer (A) 10 receives an application operation state lookup request and extracts, as the definition information of the designated application, the assigned group name, assigned application server computer name, application path name, operation priority, predetermined monitor time, and predetermined cycle time from the application operation definition storage file 500 in the management server computer (Z) 50 through the network 2.

In addition, the application operation state lookup section 107 extracts the current state of the designated application from the application current state update file 150. The application operation state lookup section 107 returns the two pieces of information to the application operation state lookup request source. The application operation state lookup request source sends the request through an operator by a window and keyboard or an application which looks up the application operation state through an application program interface (API).

According to this embodiment, the application definition information and current state can be externally looked up. Hence, the user or another application can easily know the operation state of the designated application.

The methods described above can be written in a storage medium such as a magnetic disk, optical disk, or semiconductor memory as a program that can be executed by a computer and applied to various apparatuses, or transmitted by a communication medium and applied to various apparatuses. The computer for realizing these methods loads the program stored in the storage medium and executes the above-described processing by controlling its operation by the program.

A plurality of embodiments described above can be combined.

As has been described above in detail, according to the present invention, an application management method and system which systematically manage application operation definitions of the computer system to resolve cumbersomeness of management and flexibly distribute applications, and a storage medium which stores a program for executing system application management can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An application management system applied to a system including a network and a plurality of computers connected to said network, comprising:

systematic management means, provided in a specific computer of said plurality of computers, for setting in advance operation definitions of a plurality of applications which operate on one or more computers except said specific computer and systematically managing the operation definitions, each of the operation definitions being set in a table located on the specific computer for each of the plurality of applications; and application management means, provided in said one or more computers except said specific computer, for directly accessing, through said network, at least one operation definition entry from the table containing the operation definitions managed by said specific computer to control an operation of a to-be-managed application.

2. A system according to claim 1, wherein said systematic management means comprises means for storing the operation definitions of the plurality of applications put into groups in designated units of applications or functions, and said application management means looks up the operation definitions to simultaneously operate the plurality of applications put into groups.

3. A system according to claim 1, further comprising means for monitoring an execution time of the to-be-managed application.

4. A system according to claim 1, further comprising means for detecting an operation error of the to-be-managed application and requesting said application management means to execute post processing of the application.

5. A system according to claim 1, further comprising means for setting an operable/inoperable state of each of the plurality of applications put into groups in the designated units of applications or functions.

6. A system according to claim 1, further comprising means for operating the to-be-managed application at a predetermined cycle.

7. A system according to claim 1, further comprising means for recognizing a state of an application for receiving data in communication between applications, and in accordance with a recognition result, dynamically changing a computer in which the application for receiving data operates.

8. A system according to claim 1, further comprising means for looking up an operation state of an application operating in each of plurality of computer groups.

9. An application management method applied to a system including a network and a plurality of computers connected to said network, comprising:

setting in advance, in a specific computer of said plurality of computers, operation definitions of a plurality of applications which operate on one or more computers except said specific computer;

systematically managing the operation definitions, each of the operation definitions being set in a table located on the specific computer for each of the plurality of applications; and directly accessing, through said network, at least one operation definition entry from the table containing the operation definitions managed by said specific computer to control an operation of a to-be-managed application from said one or more computers except said specific computer.

10. A method according to claim 9, further comprising:

storing the operation definitions of the plurality of applications put into groups in designated units of applications or functions; and looking up the operation definitions to simultaneously operate the plurality of applications put into groups.

11. A method according to claim 9, further comprising monitoring an execution time of the to-be-managed application.

12. A method according to claim 9, further comprising:

detecting an operation error of the to-be-managed application; and issuing an execution request for post processing of the application.

13. A method according to claim 9, further comprising setting an operable/inoperable state of each of the plurality of applications put into groups in the designated units of applications or functions.

14. A method according to claim 9, further comprising operating the to-be-managed application at a predetermined cycle.

15. A method according to claim 9, further comprising:

recognizing a state of an application for receiving data in communication between applications; and dynamically changing a computer in which the application for receiving data operates in accordance with a recognition result.

16. A method according to claim 9, further comprising looking up an operation state of an application operating in each of a plurality of computer groups.

17. A computer readable storage medium having program components stored thereon that perform application management in a system including a network and a plurality of computers connected to said network, said program components comprising:

means for setting in advance, in a specific computer of said plurality of computers, operation definitions of a plurality of applications which operate on one or more computers except said specific computer and for systematically managing the operation definitions, each of the operation definitions being set in a table located on the specific computer for each of the plurality of applications; and means for directly accessing, through said network, at least one operation definition entry from the table containing the operation definitions managed by said specific computer to control an operation of a to-be-managed application.

18. A system according to claim 1, wherein each of the operation definitions includes an assigned group name defined to manage a corresponding application.

19. A system according to claim 1, wherein each of the operation definitions includes an assigned application server computer which defines a computer capable of operating a corresponding application.

20. A system according to claim 1, wherein each of the operation definitions in the file includes an application path name which defines a location where a corresponding application execution file is stored.

21. A system according to claim 1, wherein each of the operation definitions in the file includes an operation priority which defines a priority in operation of a corresponding application.

22. A system according to claim 1, wherein each of the operation definitions in the file includes a monitor time as a reference for externally monitoring an operation time of a corresponding application.

23. A system according to claim 1, wherein each of the operation definitions in the file includes a cycle time for externally periodically operating a corresponding application.

24. A system according to claim 1, wherein each of the operation definitions in the file includes a post-processing pattern in case of an operation error of a corresponding application.

* * * * *